US008229609B2

(12) United States Patent
Bamba et al.

(10) Patent No.: US 8,229,609 B2
(45) Date of Patent: Jul. 24, 2012

(54) MARINE VESSEL CONTROL APPARATUS, MARINE VESSEL PROPULSION SYSTEM AND MARINE VESSEL INCLUDING THE SAME

(75) Inventors: Takaaki Bamba, Shizuoka (JP); Makoto Ito, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 176 days.

(21) Appl. No.: 12/731,255

(22) Filed: Mar. 25, 2010

(65) Prior Publication Data

US 2010/0250036 A1 Sep. 30, 2010

(30) Foreign Application Priority Data

Mar. 31, 2009 (JP) ................................ 2009-087083

(51) Int. Cl.
*B60L 15/00* (2006.01)

(52) U.S. Cl. .................. 701/21; 440/1; 440/85; 60/778; 60/787; 60/788; 91/193; 91/189 A; 417/344; 417/392; 417/426; 123/41.15; 123/198 D; 416/33

(58) Field of Classification Search .................... 701/21; 440/1, 85; 60/778, 787, 788; 91/193, 189 A; 417/344, 392, 426; 192/45.1, 47; 123/41.15, 123/198 D; 416/33; 477/43
See application file for complete search history.

(56) References Cited

U.S. PATENT DOCUMENTS

| | | | | |
|---|---|---|---|---|
| 5,020,492 | A * | 6/1991 | Kanno | 123/198 D |
| 6,799,546 | B1 * | 10/2004 | Gonring et al. | 123/179.3 |
| 7,108,570 | B2 * | 9/2006 | Okuyama | 440/84 |
| 8,141,510 | B2 * | 3/2012 | Ito | 114/144 RE |
| 2004/0121666 | A1 | 6/2004 | Okuyama | |
| 2006/0089060 | A1 | 4/2006 | Kawase et al. | |
| 2007/0227489 | A1 | 10/2007 | Ando | |
| 2010/0248560 | A1 * | 9/2010 | Ito et al. | 440/1 |
| 2010/0250036 | A1 * | 9/2010 | Bamba et al. | 701/21 |
| 2010/0256844 | A1 * | 10/2010 | Ito | 701/21 |

FOREIGN PATENT DOCUMENTS

| | | | |
|---|---|---|---|
| JP | 2004-052697 | A | 2/2004 |
| JP | 3958836 | B2 | 8/2007 |
| JP | 2007-263060 | A | 10/2007 |

OTHER PUBLICATIONS

InGA Yachging, InGa Yachging, 1994, Internet, p. 1-23.*

* cited by examiner

*Primary Examiner* — James Trammell
*Assistant Examiner* — McDieunel Marc
(74) *Attorney, Agent, or Firm* — Keating & Bennett, LLP

(57) ABSTRACT

A marine vessel control apparatus is arranged to start and stop engines that are respectively provided in multiple propulsion devices. The marine vessel control apparatus includes multiple individual start/stop switches arranged to correspond to the respective multiple propulsion devices and arranged to be operated by an operator to individually start and stop the engines in the respective multiple propulsion devices, an all-device start/stop switch arranged to be operated by the operator to collectively start and stop the engines in the multiple propulsion devices, an operating state acquiring unit arranged to acquire operating states of the engines in the respective multiple propulsion devices, and a control unit. The control unit includes multiple input ports corresponding to the respective multiple individual start/stop switches. Each of the input ports is connected with the corresponding individual start/stop switch. All of the input ports are connected commonly with the all-device start/stop switch. The control unit is arranged and programmed to control the start and stop of the engines in the multiple propulsion devices according to an input pattern to the multiple input ports and the operating states acquired by the operating state acquiring unit.

11 Claims, 5 Drawing Sheets

MARINE VESSEL CONTROL APPARATUS, MARINE VESSEL PROPULSION SYSTEM AND MARINE VESSEL INCLUDING THE SAME

BACKGROUND OF THE INVENTION

1. Field of the Invention

The present invention relates to a marine vessel control apparatus arranged to control multiple propulsion devices including respective engines, and to a marine vessel propulsion system and a marine vessel including such a marine vessel control apparatus.

2. Description of the Related Art

One example of a marine vessel propulsion device is an outboard motor. The outboard motor is mounted at the stern of a hull, for example. The outboard motor can generate a propulsive force by rotating a propeller with a driving force from an engine. Multiple outboard motors may be mounted on the hull depending on how large a propulsive force is required. Each outboard motor includes an outboard motor ECU (Electronic Control Unit) for engine output control.

The operator's seat in the marine vessel is provided with a steering apparatus and a remote control apparatus for output control of each outboard motor. The steering apparatus includes a steering wheel or handle, for example. The operation of the steering wheel or handle can be transmitted to each outboard motor through a cable so that the direction of each outboard motor is changed. The remote control apparatus includes levers for shift position selection and engine output control of the respective outboard motors. The shift position and engine speed of each outboard motor can be controlled according to the operational position of the corresponding lever. More specifically, the operational positions of the levers are input to remote control ECUs and, accordingly, a target shift position and a target engine speed are transmitted from each remote control ECU to the corresponding outboard motor ECU.

The shift position includes a forward drive position, a neutral position, and a reverse drive position. When the forward drive position is selected, the propeller rotates in a direction to provide a propulsive force in the forward drive direction of the marine vessel. When the reverse drive position is selected, the propeller rotates in a direction to provide a propulsive force in the reverse drive direction of the marine vessel. When the neutral position is selected, no engine output is transmitted to the propeller.

The marine vessel includes a local area network (inboard LAN) built therein. The inboard LAN is connected with the outboard motor ECUs and gauges to provide data communications therebetween.

One battery is provided for each outboard motor or arranged to commonly supply electricity to all of the multiple outboard motors. The battery supplies power to a starter motor for starting the engine, each outboard motor ECU, and each remote control ECU. The operator's seat is also provided with a power switch for switching between power supply and shutdown from the battery to the outboard motors. Multiple power switches may be provided for the respective outboard motors (see United States Patent Application Publication No. US 2006/0089060A1). Each power switch is in a form of a key switch, for example, and also acts as a starter switch for starting the corresponding engine. More specifically, when the key switch is operated from the OFF to ON position, power is supplied from the battery to the outboard motor.

When the key switch is further operated from the ON to START position, the starter is activated to start a cranking operation.

SUMMARY OF THE INVENTION

The inventors of preferred embodiments of the present invention described and claimed in the present application conducted an extensive study and research regarding a marine vessel control apparatus, such as the one described above, and in doing so, discovered and first recognized new unique challenges and previously unrecognized possibilities for improvements as described in greater detail below.

At the start of the operation of a propulsion device (e.g., outboard motor), it is necessary to operate a power switch to power on and further to perform an operation for starting the operation of the propulsion device. If multiple propulsion devices are provided, it is necessary to repeat these operations by the number of the propulsion devices. These starting operations are thus troublesome.

A dedicated circuit may be provided to collectively start the operation of the multiple propulsion devices. However, such a dedicated circuit will result in an increase in hardware cost.

In order to overcome the previously unrecognized and unsolved challenges described above, a preferred embodiment of the present invention provides a marine vessel control apparatus arranged to start and stop engines provided, respectively, in multiple propulsion devices. The marine vessel control apparatus includes multiple individual start/stop switches arranged to correspond to the respective multiple propulsion devices and arranged to be operated by an operator to individually start and stop the engines in the respective multiple propulsion devices, an all-device start/stop switch arranged to be operated by the operator to collectively start and stop the engines in the multiple propulsion devices, an operating state acquiring unit arranged to acquire operating states of the engines in the respective multiple propulsion devices, and a control unit. The control unit includes multiple input ports corresponding to the respective multiple individual start/stop switches. Each of the input ports is connected with the corresponding individual start/stop switch. All of the input ports are connected commonly with the all-device start/stop switch. The control unit is arranged and programmed to control the start and stop of the engines in the multiple propulsion devices according to an input pattern to the multiple input ports and the operating states acquired by the operating state acquiring unit.

Each individual start/stop switch may preferably be a momentary switch arranged to generate a signal only while operated, for example.

Collectively starting the operation of all the propulsion devices includes not only starting the engines in the propulsion devices all at once but also starting the engines in all of the propulsion devices sequentially at a certain time interval. Starting the engines in the multiple propulsion devices sequentially makes it easy for users to determine if any propulsion device has failed to start. Particularly if one power source (battery) is shared by multiple propulsion devices, starting the engines sequentially at intervals is preferable to distribute and space out the battery load over time. When collectively stopping the engines in the multiple propulsion devices, it is preferable to stop the engines in the multiple propulsion devices all at once (simultaneously). This allows the stop control to be highly responsive.

The control unit may be a controller including multiple input ports or may include multiple controllers that correspond, respectively, to multiple input ports. If the control unit includes multiple controllers, it is preferred that information about signal input to the input ports is communicated among the controllers. Multiple controllers may control the start and stop of the engines in the respective propulsion devices. In this case, it is preferred that information about the start and stop of the corresponding engines is communicated between the controllers.

The control unit is arranged to monitor the input to the input ports and the operating states of the engines in the propulsion devices, and start or stop the engines in the propulsion devices accordingly. Each input port is connected with one individual start/stop switch and the all-device start/stop switch. It is therefore possible to provide a command to each input port by operating either the individual start/stop switch or the all-device start/stop switch. The control unit is arranged to determine whether the input command is a start command or a stop command. Start command is for starting the engine in the propulsion device corresponding to the input port. Stop command is for stopping the engine in the propulsion device corresponding to the input port. The control unit can make a determination correctly between start and stop commands based on the input pattern to the multiple input ports and the operating states of the engines in the propulsion devices.

Since each input port is thus shared by one individual start/stop switch and the all-device start/stop switch and the control unit is arranged to make a determination on input commands, the operation of all the propulsion devices can be started and stopped collectively with no expensive dedicated circuit. That is, if the control unit is defined by a computer, the operation of the propulsion devices can be started and stopped individually as well as collectively by modifying its software or program algorithms or processes.

It is thus possible to provide a function of individually starting and stopping the engines in the multiple propulsion devices as well as a function of collectively starting and stopping all the engines with reduced hardware cost, which can boost convenience when starting the operation of the propulsion devices. That is, a user-friendly marine vessel control apparatus can be realized.

The control unit preferably includes an individual operation/simultaneous operation determining unit arranged to determine, when a command is input to one of the input ports, if a command is also input to another one of the input ports at the same time, an individual start/stop control unit arranged to, when the individual operation/simultaneous operation determining unit determines that a command is input to only one of the input ports, start or stop the engine in the propulsion device corresponding to the one input port, and an all-device start/stop control unit arranged to, when the individual operation/simultaneous operation determining unit determines that a command is input to one of the input ports and a command is also input to another one of the input ports, collectively start or stop the engines in all of the propulsion devices.

In accordance with the arrangement above, it is determined if commands are provided to two or more input ports at the same time. If a command is provided to one input port and no command is provided to the other input ports, it is determined that the corresponding individual start/stop switch is operated. On the other hand, when commands are provided to two or more input ports at the same time, it is determined that the all-device start/stop switch is operated. Based on these determinations, the engine in the corresponding propulsion device will be started or stopped individually or the engines in all of the propulsion devices are started or stopped collectively. The control unit can thus make an appropriate distinction between the operation of an individual start/stop switch and the operation of the all-device start/stop switch to take an appropriate control action.

The all-device start/stop control unit is preferably arranged and programmed such that, when the engines in all of the propulsion devices are stopped, the all-device start/stop control unit collectively starts the engines in all of the propulsion devices, while when at least one of the engines in the propulsion devices operates, the all-device start/stop control unit collectively stops the engines in all of the propulsion devices.

In accordance with the arrangement above, when the all-device start/stop switch is operated, collective start control or collective stop control is selected appropriately according to the operating states of the engines in the multiple propulsion devices. When the all-device start/stop switch is operated while the engines in all of the propulsion devices are stopped, it is considered that the user's intention is to start all the engines. Hence, in this case, the engines in all of the propulsion devices are started collectively. On the other hand, when the all-device start/stop switch is operated while the engine in any propulsion device operates, it is considered that the user's intention is appropriately to collectively start or stop all the engines. In a preferred embodiment of the present invention, the engines in all of the propulsion devices are stopped collectively. More properly, if there is an operating engine, the operation of the engine is stopped. The user is only required to operate the all-device start/stop switch again if he/she wants to collectively start all the engines.

It is considered possible to switch the operating/stop states of each engine when the all-device start/stop switch is operated, but this may be an operation against the user's intention. Specifically, assuming the case where the engines in some of the propulsion devices operate while the engines in the other propulsion devices are stopped, when the all-device start/stop switch is operated to switch the state of each engine, the operating engines will be stopped and the stopped engines will be started. However, it is considered that the user's intention is not to take such a situation. That is, when the all-device start/stop switch is operated while the engines in some of the propulsion devices operate, it is considered that the user's intention is appropriately to collectively start or stop all the engines.

The all-device start/stop control unit preferably includes a start permission condition determining unit arranged to determine if all propulsion devices capable of being started meet a predetermined engine start permission condition, and is preferably arranged to collectively start the engines in all of the propulsion devices if all the propulsion devices capable of being started meet the start permission condition.

The propulsion devices capable of being started include powered-on ones. The power supply for the multiple propulsion devices may be capable of being shut off separately, for example.

In accordance with the arrangement above, only if all the propulsion devices capable of being started meet the engine start permission condition, are the engines in all of the propulsion devices started collectively. That is, if any one of the propulsion devices capable of being started does not meet the engine start permission condition, the engines in all of the propulsion devices are not started collectively. This allows appropriate engine start control to work on all the propulsion devices capable of being started.

Propulsion devices not capable of being started due to power shutdown by some trouble and/or the user's intention may be excluded from the engine start permission condition determination. This allows the operation of only the propulsion devices capable of being started to be started collectively, whereby a user-friendly propulsion system can be provided.

The engine start permission condition may include a condition that the engine is stopped.

The propulsion devices may include a clutch mechanism arranged to provide and break connection through a power transmission path between the engine and a propulsive force generation member (e.g., propeller). In this case, the engine start permission condition may include a condition that the clutch mechanism breaks the connection. An operation unit to be operated by users to generate a command signal for switching the state of the clutch mechanism between providing and breaking of the connection may also be provided correspondingly to the clutch mechanism. In this case, the start permission condition may include a condition that the operation unit outputs a command signal for breaking the connection.

Another preferred embodiment of the present invention provides a marine vessel control apparatus arranged to start and stop engines respectively provided in multiple propulsion devices, the apparatus including multiple individual start/stop switches arranged to correspond to the respective multiple propulsion devices and arranged to be operated by an operator to individually start and stop the engines in the respective multiple propulsion devices, an all-device start/stop switch arranged to be operated by the operator to collectively start and stop the engines in the multiple propulsion devices, and a control unit. The control unit includes multiple input ports corresponding to the respective multiple individual start/stop switches. Each of the input ports is connected with the corresponding individual start/stop switch. All of the input ports are connected commonly with the all-device start/stop switch. The control unit is arranged and programmed to control the start and stop of the engines in the multiple propulsion devices according to an input to the multiple input ports.

In accordance with the arrangement above, the engines in the multiple propulsion devices can be started and stopped individually as well as collectively. This allows a user-friendly marine vessel control apparatus meeting user needs to be provided.

The control unit preferably is arranged and programmed to, when collectively starting the engines in the multiple propulsion devices, start the engines in the multiple propulsion devices sequentially at a certain time interval.

In accordance with the arrangement above, the engines in the multiple propulsion devices are started sequentially, which makes it easy for users to determine if any propulsion device has failed to start. If one power source (battery) is shared by multiple propulsion devices, the battery load can be distributed and spaced out over time. Therefore, even if the battery may have only a low capacity, the engines in the propulsion devices can be started reliably.

When collectively stopping the engines in the multiple propulsion devices, it is preferable to stop the engines all at once (simultaneously). This allows the stop control to be highly responsive.

The control unit is preferably arranged and programmed such that, when the engines in all of the propulsion devices are stopped, the control unit collectively starts the engines in all of the propulsion devices, while when at least one of the engines in the propulsion devices operates, the control unit collectively stops the engines in all of the propulsion devices.

In accordance with the arrangement above, when the all-device start/stop switch is operated, collective start control or collective stop control is selected appropriately according to the operating states of the engines in the multiple propulsion devices. When the all-device start/stop switch is operated while the engines in all of the propulsion devices are stopped, it is considered that the user's intention is to start all the engines. Hence, in this case, the engines in all of the propulsion devices are started collectively. On the other hand, when the all-device start/stop switch is operated while the engine in any propulsion device operates, it is considered that the user's intention is appropriately to collectively start or stop all the engines. In a preferred embodiment of the present invention, the engines in all of the propulsion devices are stopped collectively. More properly, if there is an operating engine, the operation of the engine is stopped. The user is only required to operate the all-device start/stop switch again if he/she wants to collectively start all the engines.

Various preferred embodiments of the present invention provide a marine vessel propulsion system including multiple propulsion devices each including an engine, and a marine vessel control apparatus arranged to control the multiple propulsion devices and having the above-described features. With this arrangement, it is possible to provide a function of individually starting and stopping the engines in the multiple propulsion devices as well as a function of collectively starting and stopping all the engines with reduced hardware cost, which can boost convenience when starting the operation of the propulsion devices. That is, a user-friendly marine vessel propulsion system can be realized.

Another preferred embodiment of the present invention provides a marine vessel including a hull, multiple propulsion devices mounted on the hull and each including an engine, and a marine vessel control apparatus arranged to control the multiple propulsion devices and having the above-described features. With this arrangement, it is possible to provide a function of individually starting and stopping the engines in the multiple propulsion devices as well as a function of collectively starting and stopping all the engines with reduced hardware cost, which can boost convenience when starting the operation of the propulsion devices.

The propulsion devices may be in any form of outboard motors, inboard and outboard motors (stern drive, i.e., inboard motor/outboard drive), or inboard motors. Outboard motors include an outboard propulsion unit including an engine and a propeller, being accompanied by a steering mechanism for turning the entire propulsion unit horizontally with respect to the hull. Inboard and outboard motors include an inboard engine and an outboard drive unit including a propeller and a steering mechanism. Inboard motors include an inboard engine and a drive unit with a propeller shaft being extended outboard from the drive unit.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
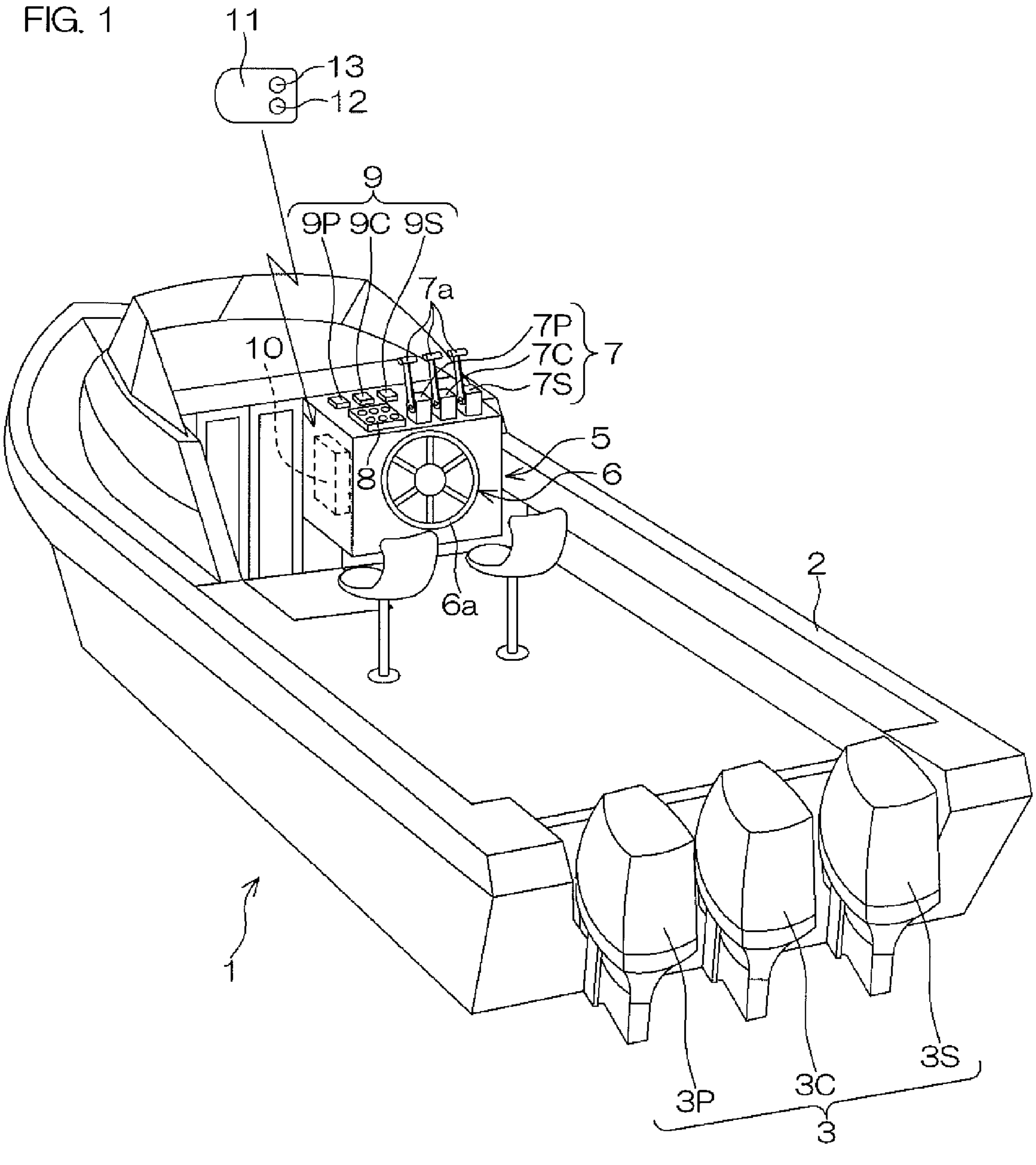
FIG. 1 is a perspective view illustrating the configuration of a marine vessel according to a preferred embodiment of the present invention.

FIG. 1 is a perspective view illustrating the configuration of a marine vessel according to a preferred embodiment of the present invention. The marine vessel 1 includes a hull 2 and multiple outboard motors 3 (preferably three motors in this preferred embodiment, for example) as propulsion devices. These outboard motors 3 are mounted side by side at the stern of the hull 2. The three outboard motors can be distinguished by referring to the starboard side, center, and portside ones, respectively, as "starboard side outboard motor 3S," "center outboard motor 3C," and "portside outboard motor 3P." The outboard motors 3 each include an engine (internal combustion engine), and the propeller is to be rotated by a driving force from the engine to generate a propulsive force.

An operator's seat 5 is provided in the front (preferably on the stern side) of the hull 2. The operator's seat 5 is provided with a steering apparatus 6, remote control apparatuses 7, a control panel 8, and gauges 9.

The steering apparatus 6 includes a steering wheel 6*a* to be rotated by a marine vessel maneuvering operator. The operation of the steering wheel 6*a* can be transmitted mechanically through a cable (not shown) to a steering mechanism (not shown) provided at the stern. The steering mechanism interlocks the three outboard motors 3 to change their direction. This allows the direction of propulsive forces to change and therefore the heading direction of the marine vessel 1 is changed. It will be appreciated that a power steering apparatus may be adopted including a sensor arranged to detect the steering angle of the steering wheel 6*a* and an actuator arranged to be driven according to the steering angle detected by the sensor. In this case, there is no mechanical linkage between the steering wheel 6*a* and the steering mechanism. That is, the actuator can be driven by a control signal according to a steering wheel operation and the outboard motors 3 are to be turned by the driving force.

The three remote control apparatuses 7, which are provided correspondingly to the three outboard motors 3, can be distinguished by referring to ones corresponding to the starboard side, center, and portside outboard motors 3S, 3C, and 3P, respectively, as "starboard-side remote control apparatus 7S," "center remote control apparatus 7C," and "portside remote control apparatus 7P." The remote control apparatuses 7 each include a back-and-forth operable lever 7*a*, and the operational position of the lever 7*a* is to be detected. The operation of each outboard motor 3 can be controlled based on the detected operational position. When the lever 7*a* is operated forward by a predetermined amount or more from a predetermined neutral position, the shift position of the corresponding outboard motor 3 is in the forward drive position and a propulsive force in the forward drive direction is generated by the outboard motor 3. When the lever 7*a* is operated backward by a predetermined amount or more from the neutral position, the shift position of the corresponding outboard motor 3 is in the reverse drive position and a propulsive force in the reverse drive direction is generated by the outboard motor 3. When the lever 7*a* is in the neutral position, the shift position of the corresponding outboard motor 3 is in the neutral position and no propulsive force is generated by the outboard motor 3. The output of each outboard motor 3, that is, the target engine speed of the engine provided in the outboard motor 3 can also be changed according to the amount of operation of the lever 7*a*.

The target engine speed keeps an idle speed within the predetermined amount of operation (forward drive shift-in position). When the lever 7*a* is operated forward over the forward drive shift-in position, the target engine speed is set such that the larger the amount of operation of the lever, the higher the target engine speed. The target engine speed also keeps an idle speed within the predetermined amount of operation (reverse drive shift-in position). When the lever 7*a* is operated backward over the reverse drive shift-in position, the target engine speed is set such that the larger the amount of operation of the lever, the higher the target engine speed.

Figure 2:
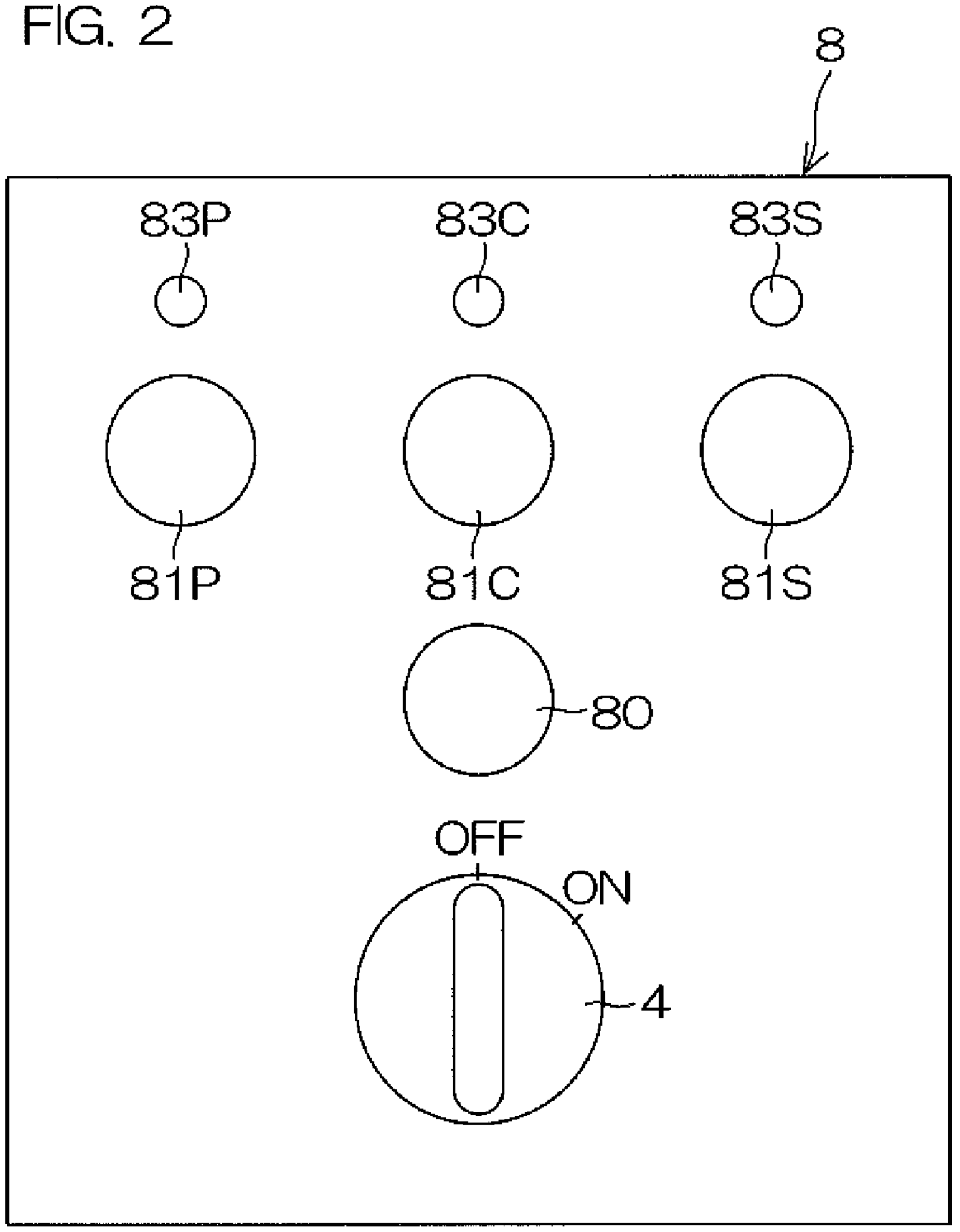
FIG. 2 is a schematic plan view of a control panel.

As shown in an enlarged manner in FIG. 2, the control panel 8 includes a key switch 4 for collective power on of the three outboard motors 3S, 3C, and 3P. The control panel 8 also includes an all-device start/stop switch 80 arranged to collectively start the engines in powered-on outboard motors 3. The control panel 8 further includes three start/stop switches 81S, 81C, and 81P (hereinafter collectively referred to as "start/stop switches 81" when appropriate) corresponding to the three respective outboard motors 3S, 3C, and 3P. The control panel 8 also includes power indicators 83S, 83C, and 83P provided in the vicinity of the respective start/stop switches 81S, 81C, and 81P.

The key switch 4 is operable between the OFF and ON positions by inserting an associated key in its key cylinder. In the OFF position, the power supply for all the outboard motors 3 is shut off collectively. In the ON position, all the outboard motors 3 are powered on collectively.

The all-device start/stop switch 80 preferably is a momentary switch to be operated to collectively start and stop the operation of all the outboard motors 3.

The start/stop switches 81 are also preferably momentary switches to be operated to individually start and stop the engine in the corresponding outboard motor 3. When a start/stop switch 81 is operated while the engine in the corresponding outboard motor 3 is stopped, a start command for starting the engine in the outboard motor 3 is generated. When a start/stop switch 81 is operated while the engine in the corresponding outboard motor 3 operates, a stop command for stopping the engine in the outboard motor 3 is generated. When a start/stop switch 81 is operated for a predetermined period of time or more (i.e., pressed and held) while the corresponding engine operates, a power-off command for power shutdown of the corresponding outboard motor 3 is generated.

The power indicators 83S, 83C, and 83P are each preferably defined by, for example, an LED lamp and arranged to turn on when the corresponding outboard motor 3 is powered on, while to turn off when the motor is powered off.

Referring again to FIG. 1, the three gauges 9, which are provided correspondingly to the three outboard motors 3, can be distinguished by referring to ones corresponding to the starboard side, center, and portside outboard motors 3S, 3C, and 3P, respectively, as "starboard-side gauge 9S," "center gauge 9C," and "portside gauge 9P." These gauges 9 are arranged to display the states of the corresponding outboard motors 3. More specifically, they are arranged to display the power-on/off, engine speed, and other necessary information of the corresponding outboard motors 3.

The operator's seat 5 is further provided with an immobilizer 10 (receiver). The immobilizer 10 is arranged to receive a signal from a key unit 11 carried by a user of the marine vessel 1 and to allow only an authorized user to use the marine vessel 1 normally. The key unit 11 includes a lock button 12 and an unlock button 13. The lock button 12 is arranged to be operated to set the immobilizer 10 to a locked state. When the lock button 12 is operated, a lock signal is sent from the key unit 11. Once the immobilizer 10 is set to a locked state, the normal use of the marine vessel 1 is prohibited. The unlock button 13 is arranged to be operated to release the locked state, set the immobilizer 10 to an unlocked state, and start the normal use of the marine vessel 1. When the unlock button 13 is operated, an unlock signal is sent from the key unit 11. The key unit 11 is also arranged to send a user authentication code together with the lock and unlock signals.

The immobilizer 10 is arranged to receive the user authentication code from the key unit 11 and perform user authentication processing. That is, the immobilizer 10 determines if the received authentication code matches preliminarily registered verification data. If the user authentication processing is completed successfully, the immobilizer 10 accepts the lock or unlock signal from the key unit 11. If the user authentication processing is completed unsuccessfully, the immobilizer 10 responds to neither the lock nor unlock signal from the key unit 11.

Figure 3:
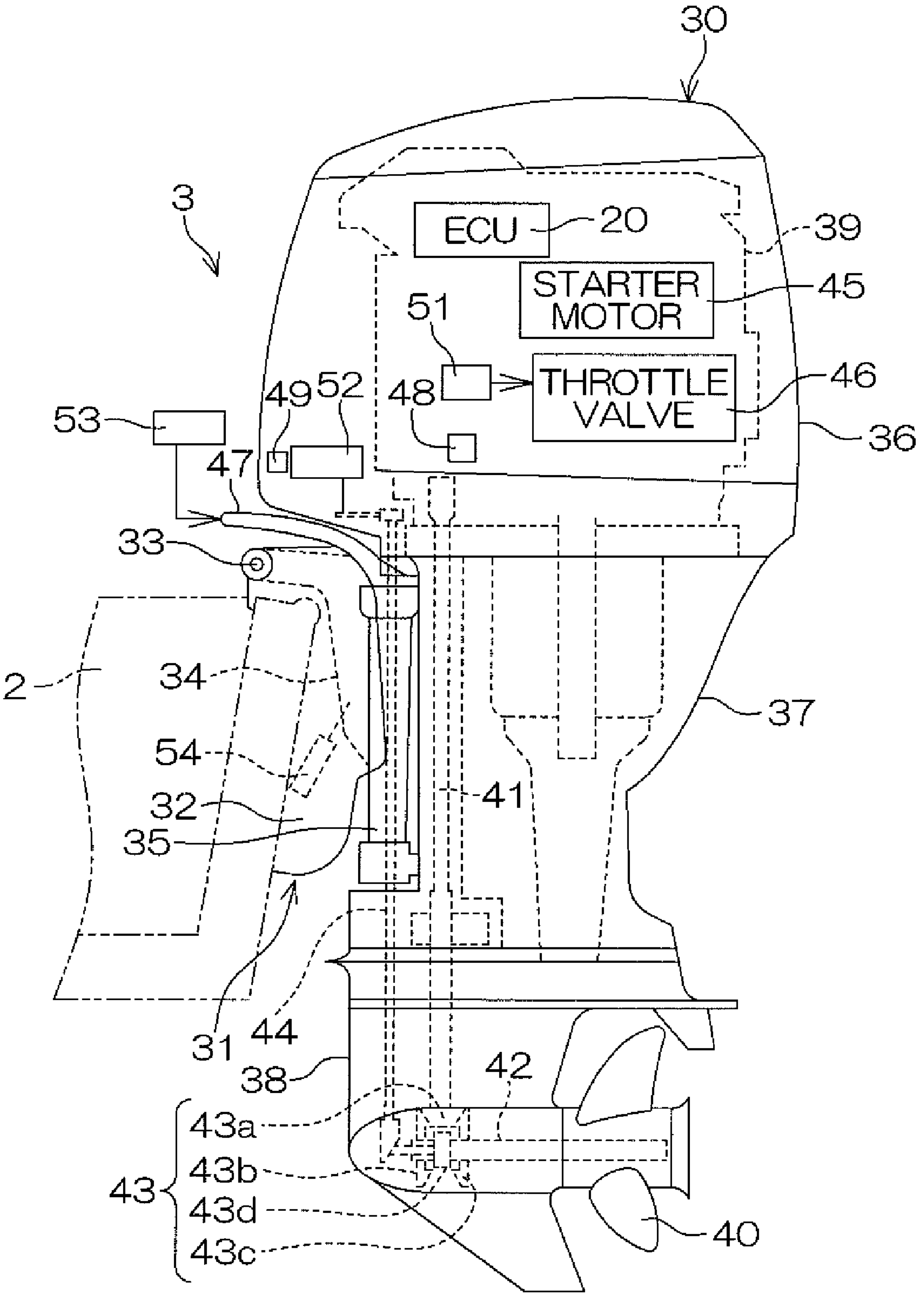
FIG. 3 illustrates an example of the configuration of an outboard motor.

FIG. 3 illustrates an example of the configuration common to the three outboard motors 3. The outboard motors 3 each includes a propulsion unit 30 and a mounting mechanism 31 arranged to mount the propulsion unit 30 on the hull 2. The mounting mechanism 31 includes a clamp bracket 32 arranged to be detachably fixed to the stern board of the hull 2, and a swivel bracket 34 coupled to the clamp bracket 32 rotatably centering on a tilt axis 33 as a horizontal axis of rotation. The propulsion unit 30 is fitted to the swivel bracket 34 rotatably about a steering axis 35. With this arrangement, the steering angle (angle of direction of the propulsive force with respect to the centerline of the hull 2) can be changed by rotating the propulsion unit 30 about the steering axis 35. The trim angle of the propulsion unit 30 can also be changed by rotating the swivel bracket 34 about the tilt axis 33. The trim angle corresponds to an angle at which the outboard motor 3 is mounted on the hull 2.

The housing of the propulsion unit 30 includes a top cowling or an engine cover 36, an upper case 37, and a lower case 38. An engine 39 as a drive source is installed inside the engine cover 36 with its crankshaft line extending vertically. A power transmitting drive shaft 41 is connected at the lower end of the crankshaft of the engine 39 and extends vertically through the upper case 37 into the lower case 38.

A propeller 40 as a propulsive force generation member is installed rotatably in the lower portion and on the rear side of the lower case 38. A propeller shaft 42 as the rotation axis of the propeller 40 extends horizontally in the lower case 38. The rotation of the drive shaft 41 can be transmitted to the propeller shaft 42 via a shift mechanism 43 as a clutch mechanism.

The shift mechanism 43 includes a drive gear 43*a* preferably defined by a bevel gear fixed at the lower end of the drive shaft 41, a forward drive gear 43*b* preferably defined by a bevel gear arranged rotatably on the propeller shaft 42, a reverse drive gear 43*c* also preferably defined by a bevel gear arranged rotatably on the propeller shaft 42, and a dog clutch 43*d* arranged between the forward and reverse drive gears 43*b* and 43*c*.

The forward drive gear 43*b* is engaged with the drive gear 43*a* on the front side thereof, while the reverse drive gear 43*c* is engaged with the drive gear 43*a* on the rear side thereof. Therefore, the forward and reverse drive gears 43*b* and 43*c* can rotate in mutually opposite directions.

On the other hand, the dog clutch 43*d* is splined to the propeller shaft 42. That is, the dog clutch 43*d* is slidable on the propeller shaft 42 in its axial direction, but not relatively rotatable with respect to the propeller shaft 42, i.e., only rotatable together with the propeller shaft 42.

The dog clutch 43*d* is slidable on the propeller shaft 42 through rotation of a shift rod 44 that extends vertically in parallel with the drive shaft 41. This arrangement allows the dog clutch 43*d* to be controlled to be in a shift position selected from among a forward drive position which is coupled to the forward drive gear 43*b*, a reverse drive position which is coupled to the reverse drive gear 43*c*, and a neutral position which is coupled to neither the forward drive gear 43*b* nor the reverse drive gear 43*c*.

When the dog clutch 43*d* is in the forward drive position, the rotation of the forward drive gear 43*b* is transmitted to the propeller shaft 42 via the dog clutch 43*d*. This causes the propeller 40 to rotate in a direction (forward drive direction) to generate a propulsive force in the forward drive direction of the hull 2. On the other hand, when the dog clutch 43*d* is in the reverse drive position, the rotation of the reverse drive gear 43*c* is transmitted to the propeller shaft 42 via the dog clutch 43*d*. Since the reverse drive gear 43*c* can rotate in the opposite direction of the forward drive gear 43*b*, this causes the propeller 40 to rotate in the opposite direction (reverse drive direction) to generate a propulsive force in the reverse drive direction of the hull 2. When the dog clutch 43*d* is in the neutral position, the rotation of the drive shaft 41 is not transmitted to the propeller shaft 42. That is, since the connection through the power transmission path between the engine 39 and the propeller 40 is broken, no propulsive force is generated in any direction.

A starter motor 45 arranged to start the engine 39 is arranged in association with the engine 39. The starter motor 45 is controlled by an outboard motor ECU (Electronic Control Unit) 20. A throttle actuator 51 is also provided to operate a throttle valve 46 in the engine 39 to change the throttle opening degree and therefore the intake air amount of the engine 39 is changed. The throttle actuator 51 may include an electric motor. The operation of the throttle actuator 51 is controlled by the outboard motor ECU 20. The engine 39 further includes an engine speed detecting portion 48 arranged to detect the speed of the engine 39 by detecting the rotation of the crankshaft.

A shift actuator 52 (clutch actuator) arranged to change the shift position of the dog clutch 43*d* is also provided in association with the shift rod 44. The shift actuator 52 may include, for example, an electric motor and its operation is controlled by the outboard motor ECU 20. In association with the shift actuator 52, a shift position sensor 49 is provided and is arranged to detect the shift position of the shift mechanism 43.

Further, a steering rod 47 is fixed to the propulsion unit 30, and a steering mechanism 53 to be driven by the steering apparatus 6 (see FIG. 1) is coupled to the steering rod 47. The steering mechanism 53 allows the propulsion unit 30 to rotate about the steering axis 35 to thereby provide steering operations.

A trim actuator (tilt trim actuator) 54 is arranged between the clamp bracket 32 and the swivel bracket 34. The trim actuator 54 includes, for example, a hydraulic cylinder and is controlled by the outboard motor ECU 20. The trim actuator 54 can rotate the propulsion unit 30 about the tilt axis 33 by rotating the swivel bracket 34 about the tilt axis 33.

Figure 4:
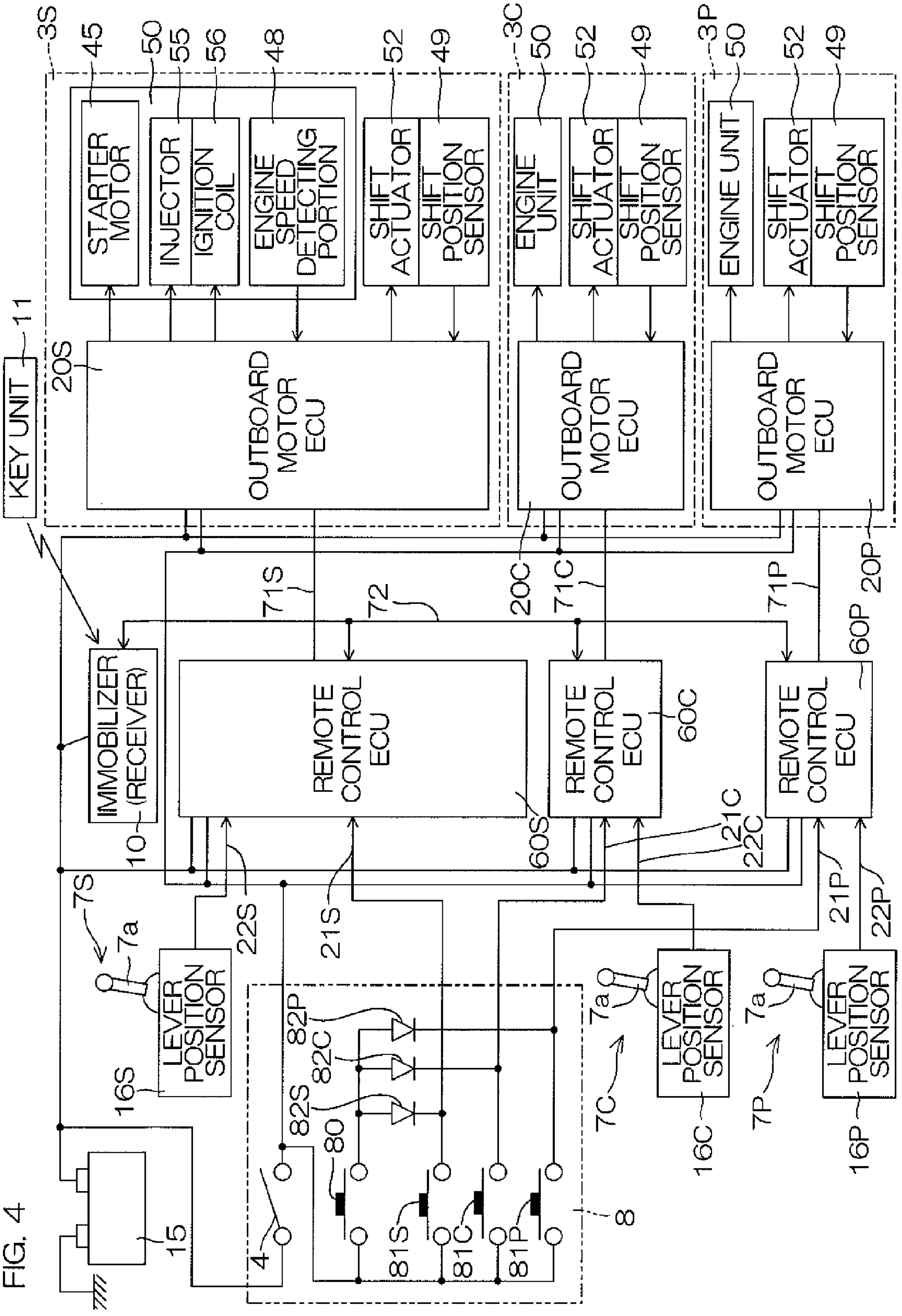
FIG. 4 illustrates the electrical configuration of the marine vessel.

FIG. 4 illustrates the electrical configuration of the marine vessel 1. The gauges 9 and power indicators 83 are not included in this figure.

Starboard-side remote control ECU (Electronic Control Unit) 60S, center remote control ECU 60C, and portside remote control ECU 60P (hereinafter collectively referred to as "remote control ECUs 60" when appropriate) are arranged to correspond to the starboard-side remote control apparatus 7S, center remote control apparatus 7C, and portside remote control apparatus 7P. These remote control ECUs 60S, 60C, and 60P are arranged to be capable of communicating command signals and other necessary information with the corresponding outboard motor ECUs 20S, 20C, and 20P (each corresponding to the outboard motor ECU 20 in FIG. 3), respectively, via communication lines 71S, 71C, and 71P. The remote control ECUs 60S, 60C, and 60P are also arranged to be capable of communicating information with each other via a communication line 72. These communication lines 71S, 71C, 71P, and 72 may be in a form of a LAN (Local Area Network) built in the marine vessel 1, for example.

The immobilizer 10 (receiver) is connected to the remote control ECUs 60S, 60C, and 60P via the communication line 72. The immobilizer 10 can perform user authentication processing through radio communications with the key unit 11, as described above. If an unlock signal is received from the key unit 11 and the user authentication processing is completed successfully, the immobilizer 10 inputs an unlock command to the remote control ECUs 60S, 60C, and 60P.

The remote control ECUs 60, outboard motor ECUs 20, and immobilizer 10 are supplied with power from a battery 15 as a power source. Three batteries 15 may be provided to correspond to the three respective outboard motors 3, for example. However, in this preferred embodiment, one battery 15 is shared by the three outboard motors 3 for power supply, for example.

The key switch 4 is arranged on the control panel 8 and has two terminals, one being connected to the battery 15 and the other being connected to all the remote control ECUs 60S, 60C, and 60P and all the outboard motor ECUs 20S, 20C, and 20P. When the key switch 4 is operated and turned ON to provide a conduction path, power circuits incorporated in the remote control ECUs 60 and outboard motor ECUs 20 are activated, and thus computers incorporated in the ECUs 60 and 20 start to operate. When the key switch 4 is operated and turned OFF to break the conduction path, the remote control ECUs 60 and outboard motor ECUs 20 perform predetermined termination processing, and thereafter the power supply for the power circuits is shut off to stop their operations. Collective power on and off of all the outboard motors 3 can thus be realized.

First ends of the respective start/stop switches 81S, 81C, and 81P are connected, respectively, to input ports 21S, 21C, and 21P (hereinafter collectively referred to as "input ports 21" when appropriate) of the starboard side outboard motor ECU 20S, center outboard motor ECU 20C, and portside outboard motor ECU 20P. Second ends of the respective start/stop switches 81S, 81C, and 81P are connected to the battery 15 via the key switch 4.

The start/stop switches 81 are each preferably defined by, for example, a push-button switch and, in particular, a momentary switch that provides a conduction path only while being pressed down. Therefore, each start/stop switch 81, if operated while the key switch 4 provides a conduction path, can generate a significant signal only during its operation. If this signal is generated while the engine 39 in the corresponding outboard motor 3 is stopped, the corresponding remote control ECU 60 interprets the signal as a start command. On the other hand, if a signal from each start/stop switch 81 is input while the engine 39 in the corresponding outboard motor 3 operates, the corresponding remote control ECU 60 interprets the signal as a stop command.

A first end of the all-device start/stop switch 80 is connected commonly to the input ports 21 of all the remote control ECUs 60. A second end of the all-device start/stop switch 80 is connected to the battery 15 via the key switch 4. More specifically, the first end of the all-device start/stop switch 80 is connected to the input port 21S of the starboard-side remote control ECU 60S via a diode 82S. The first end of the all-device start/stop switch 80 is also connected to the input port 21C of the center remote control ECU 60C via a diode 82C. The first end of the all-device start/stop switch 80 is further connected to the input port 21P of the portside remote control ECU 60P via a diode 82P. The diodes 82S, 82C, and 82P can prevent signals generated when the start/stop switches 81S, 81C, and/or 81P are operated from entering the input ports 21 of the remote control ECUs other than the corresponding remote control ECUs 60.

The all-device start/stop switch 80 is preferably defined by, for example, a push-button switch and, in particular, a momentary switch that provides a conduction path only while being pressed down. Therefore, the all-device start/stop switch 80, if operated while the key switch 4 provides a conduction path, can generate a significant signal only during its operation.

When the all-device start/stop switch 80 is operated while the key switch 4 provides a conduction path and the engines 39 in all of the outboard motors 3 are stopped, a signal generated by this operation is interpreted as an all-device start command and the engines 39 in all of the outboard motors 3 are to be started. When the all-device start/stop switch 80 is operated while at least one of the engines 39 in the outboard motors 3 operates, a signal generated by this operation is interpreted as an all-device stop command and the engines 39 in all of the operating outboard motors 3 are to be stopped. These operations will hereinafter be described in detail.

The starboard-side remote control apparatus 7S, center remote control apparatus 7C, and portside remote control apparatus 7P include, respectively, lever position sensors 16S, 16C, and 16P (hereinafter collectively referred to as "lever position sensors 16" when appropriate). The lever position sensors 16S, 16C, and 16P are arranged to detect the operational position of the corresponding remote control lever 7*a* and each formed by, for example, a potentiometer. Output signals from these lever position sensors 16S, 16C, and 16P are input, respectively, to input ports 22S, 22C, and 22P (hereinafter collectively referred to as "input ports 22" when appropriate) of the corresponding remote control ECUs 60S, 60C, and 60P. Each remote control ECU 60 sets the target shift position of the corresponding shift mechanism 43 and the target engine speed of the corresponding engine 39 based on lever position information input to its input port 22, and sends the set values to the corresponding outboard side motor ECU 20 via the communication line 71.

The outboard motor ECUs 20 are arranged to control the operation of the corresponding starter motors 45, shift actuators 52, and other components. The outboard motor ECUs 20 are also arranged to receive an engine speed detected by the corresponding engine speed detecting portions 48, a shift position detected by the corresponding shift position sensors 49, and other information. The outboard motor ECUs 20 are further arranged to control an injector 55 and an ignition coil 56. The injector 55 is an apparatus arranged to inject fuel into an intake pipe of the engine 39. The control of the injector 55 by the outboard motor ECU 20 is called fuel injection control. The ignition coil 56 is an apparatus arranged to apply a high voltage to a spark plug arranged to ignite the mixture of fuel and air via electric discharge in the combustion chamber of the engine 39. The control of the ignition coil 56 by the outboard motor ECU 20 is called ignition control. The starter motors 45 are each arranged to be energized, when starting the corresponding engine 39, to start a cranking operation for rotating the crankshaft of the engine 39, as described above. The control of the starter motor 45 by the outboard motor ECU 20 is called start control. The starter motor 45, injector 55, ignition coil 56, and engine speed detecting portion 48 constitute an engine unit 50 together with the engine 39.

Figure 5:
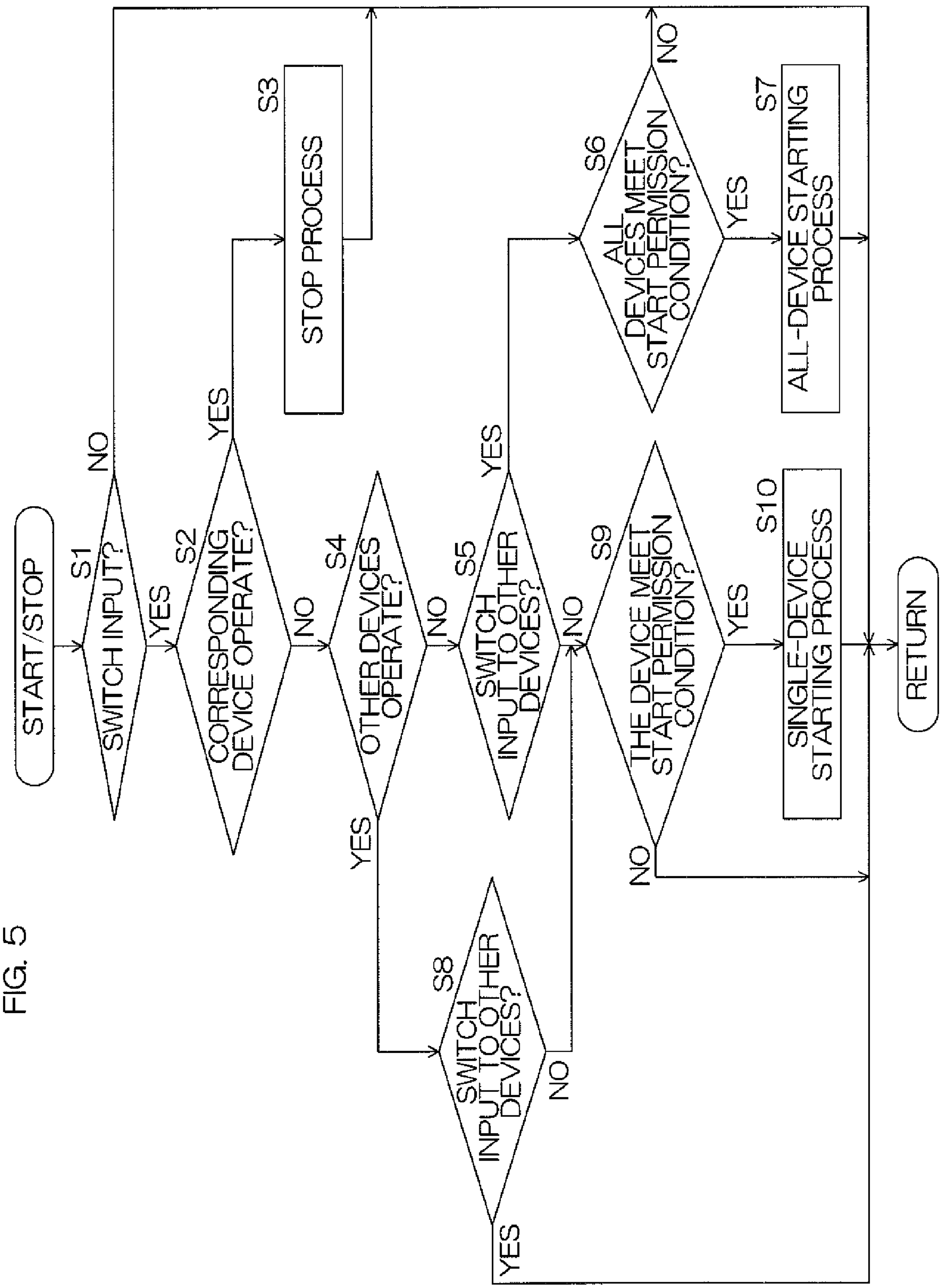
FIG. 5 is a flow chart illustrating engine start/stop control by a remote control ECU.

FIG. 5 is a flow chart illustrating repetitive processing performed by the computer incorporated in each remote control ECU 60 every predetermined control cycle and, in particular, processing performed in response to an input signal from its input port 21.

The remote control ECU 60 monitors the input port 21 to determine if there is a switch input (Step S1). If there is no switch input, the routine terminates at this control cycle.

If there is a switch input (YES in Step S1), the remote control ECU 60 determines if the engine 39 in the corresponding outboard motor 3 (corresponding device) operates (Step S2). This determination can be specifically made based on engine speed acquired from the corresponding outboard motor ECU 20 via the communication line 71. If the engine 39 in the corresponding outboard motor 3 operates (YES in Step S2), the remote control ECU 60 provides a stop command to the corresponding outboard motor ECU 20 via the communication line 71 (stop process in Step S3). The outboard motor ECU 20 receiving the stop command performs processing to stop the engine 39. Specifically, the ignition control and fuel injection control are stopped.

If the corresponding start/stop switch 81 is operated, only the engine in the outboard motor 3 corresponding to the remote control ECU 60 is stopped. If the all-device start/stop switch 80 is operated, the same stop process is applied to all the operating outboard motors 3. This causes the engines 39 in the operating outboard motors 3 to be stopped all at once (simultaneously).

In Step S2, if it is determined that the engine 39 in the corresponding outboard motor 3 is stopped, the remote control ECU 60 further determines if there is at least one operating outboard motor 3 other than the corresponding one (Step S4). This determination can be made by acquiring information about the operating states of the other outboard motors (other devices) through communications between the remote control ECUs 60 via the communication line 72.

If the engine in the corresponding device is stopped (NO in Step S2) and the engines 39 in all of the other outboard motors 3 are also stopped (NO in Step S4), this means that the engines 39 in all of the outboard motors 3 are stopped. In this case, the remote control ECU 60 further determines if there is a signal input to the input ports 21 of the remote control ECUs 60 corresponding to the other devices (i.e., the other remote control ECUs 60) (Step S5). This determination can be made by acquiring information about the existence of a signal input to the input ports 21 of the other remote control ECUs 60 through communications between the remote control ECUs 60 via the communication line 72.

If there is a signal input to the input ports 21 of the other remote control ECUs 60 (YES in Step S5), that is, there are signals input simultaneously to the respective input ports 21 of multiple remote control ECUs 60, the remote control ECU 60 determines that the all-device start/stop switch 80 is operated. That is, the remote control ECU 60 determines that a command for starting the engines 39 in all of the outboard motors 3 (all-device start command) is provided. The remote control ECU 60 then determines if all powered-on outboard motors 3 meet a start permission condition (Step S6). The remote control ECUs 60 are arranged to individually determine if the corresponding outboard motor 3 meets the start permission condition. Therefore, the remote control ECU 60 determines if the corresponding outboard motor 3 meets the start permission condition, and further acquires results of determining if the other outboard motors meet the start permission condition through communications between the remote control ECUs 60 via the communication line 72.

The start permission condition includes that the engine 39 in the corresponding outboard motor 3 is stopped, the shift position (actual shift position) of the shift mechanism 43 in the outboard motor 3 is in the neutral position, and the operational position (target shift position) of the remote control lever in the corresponding remote control apparatus 7 is in the neutral position. When all of these are met, it is determined that the start permission condition is met. Since the power supply for the outboard motors 3 can be shut off separately by pressing and holding the corresponding start/stop switch 81 as described above, for example, the determination in Step S6 covers all powered-on outboard motors 3.

If it is determined that all powered-on outboard motors 3 meet the start permission condition (YES in Step S6), the remote control ECU 60 performs an all-device starting process (Step S7). In the all-device starting process, the engines 39 in the multiple outboard motors 3 are started sequentially at a certain time interval. Therefore, the multiple remote control ECUs 60S, 60C, and 60P provide a start command to the corresponding outboard motor ECUs 20 in a predefined order at intervals. More specifically, the remote control ECU 60 corresponding to the outboard motor 3 with the first starting priority provides an engine start command to the corresponding outboard motor ECU 20. At the same time, the remote control ECU 60 informs, via the communication line 72, the remote control ECU 60 corresponding to the outboard motor 3 with the second starting priority of the fact of issuing the engine start command. After receiving the information, the remote control ECU 60 with the second starting priority provides an engine start command to the corresponding outboard motor ECU 20 after a predetermined period of time longer than the cranking time for the engine start. The remote control ECU 60 corresponding to the outboard motor 3 with the third starting priority is then informed of this via the communication line 72. After receiving the information, the remote control ECU 60 with the third starting priority provides an engine start command to the corresponding outboard motor ECU 20 after a predetermined period of time longer than the cranking time for the engine start.

In Step S4, if it is determined that there is any other operating outboard motor 3 (YES in Step S4), the remote control ECU 60 also determines if there is a signal input to the input ports 21 of the other remote control ECUs 60 (Step S8). If there is a signal input to the other remote control ECUs 60 (YES in Step S8), the routine terminates with no subsequent processing. This corresponds to the case where the all-device start/stop switch 80 is operated while the engine in the corresponding device is stopped. In this case, the engine 39 in the corresponding outboard motor 3 (corresponding device) is held in a stopped state, while the remote control ECUs 60 that correspond to the other operating outboard motors 3 perform an engine stop process (Steps S2 and S3). Thus, when the all-device start/stop switch 80 is operated while at least one of the engines 39 in the outboard motors 3 operates, the engines 39 in all of the outboard motors 3 are to be stopped.

On the other hand, if it is determined that there is no signal input to the input ports 21 of the other remote control ECUs 60 in Step S5 or S8, this means that the engine in the corresponding device is stopped and the corresponding start/stop switch 81 is operated. Hence, the remote control ECU 60 determines if the corresponding outboard motor 3 meets a start permission condition (Step S9). If the start permission condition is met, the remote control ECU 60 provides an engine start command to the corresponding outboard motor ECU 20 (Step S10). This process is not for starting the engines 39 in all of the outboard motors 3 but for separately starting only the engine 39 in the corresponding outboard motor 3. That is, no engine start timing adjustment is performed with the other outboard motors 3 to issue the engine start command immediately.

The outboard motor ECU 20 receiving the engine start command drives the starter motor 45 to start a cranking operation as well as ignition control and fuel injection control. If the start permission condition is not met (NO in Step S9), the routine terminates without starting the engine.

The processing performed by each remote control ECU 60 in response to an input to its input port 21 is summarized in the following Table 1.

TABLE 1

| Corresponding engine | Other engines | All-device switch | Individual switch | To be performed |
|---|---|---|---|---|
| Stopped | All stopped | Operated | | All-device starting |
| Stopped | All stopped | | Operated | Single-device starting |
| Stopped | Some operate | Operated | | Stop-state holding |
| Stopped | Some operate | | Operated | Single-device starting |
| Operates | All stopped | Operated | | Stopping |
| Operates | All stopped | | Operated | Stopping |
| Operates | Some operate | Operated | | Stopping |
| Operates | Some operate | | Operated | Stopping |

"Corresponding engine" represents the state of the engine 39 in the outboard motor 3 (corresponding device) corresponding to the remote control ECU 60. "Other engines" represents the state of the engines 39 in the outboard motors 3 (other devices) corresponding to the remote control ECUs 60 other than the remote control ECU 60 in question. "All stopped" means that the engines in all of the other devices are stopped. "Some operate" means that at least one of the engines in the other devices operates. "All-device switch" represents the all-device start/stop switch 80. "Individual switch" represents the corresponding start/stop switch 81. "Operated" in the "switch" columns means that the remote control ECU 60 determines that the corresponding switch is operated. "To be performed" represents a process to be performed by the remote control ECU 60. "All-device starting" corresponds to the process in Step S7 of FIG. 5. "Single-device starting" corresponds to the process in Step S10 of FIG. 5. "Stop-state holding" means that no particular process is performed to hold the engine 39 in the corresponding outboard motor 3 in a stopped state (YES in Step S8 of FIG. 5). "Stopping" corresponds to the process in Step S3 of FIG. 5.

As described heretofore, in accordance with this preferred embodiment, the input port 21 of each remote control ECU 60 is input with the corresponding individual start/stop switch 81 and commonly with the all-device start/stop switch 80 to realize collective starting and stopping of all the outboard motors 3 as well as individual starting and stopping of the corresponding outboard motor 3. That is, there is provided an all-device collective start/stop function through software processing by the remote control ECU 60 with minimum hardware added. This can boost convenience when starting and stopping the operation of the multiple outboard motors 3 with reduced cost.

Also, when the all-device start/stop switch 80 is operated while at least one of the outboard motors 3 is in an operation state, all operating outboard motors 3 are stopped. It is considered that the user's intention of operation in this case is to start or stop all the engines; however, in this preferred embodiment, it is arranged that the operation of all the outboard motors 3 is to be stopped. The user is only required to operate the all-device start/stop switch 80 again if he/she wants to start all the engines, which does not reduce the usability of the system.

Although a preferred embodiment of the present invention has heretofore been described, the present invention may be embodied in another form. For example, although the preferred embodiment above describes the case where one key switch 4 is preferably shared by all the outboard motors 3 for collective power on and off, one key switch may be provided for each outboard motor 3, for example. In this case, the outboard motors 3 can be powered on and off individually by operating the corresponding key switch.

Although the preferred embodiment above describes the case where multiple remote control ECUs 60 preferably are arranged to correspond to the respective multiple remote control apparatuses 7, only one remote control ECU may be provided to commonly receive signals from the multiple remote control apparatuses 7. In this case, inter-ECU communications are established between the one remote control ECU and the multiple outboard motor ECUs 20.

Although the preferred embodiment above preferably exemplifies a marine vessel propulsion system including an immobilizer 10, the present invention is also applicable to systems including no immobilizer.

Although the preferred embodiment above preferably exemplifies an outboard motor as a propulsion device, the present invention is also applicable to marine vessel propulsion systems including a propulsion device of another type. Examples of such a propulsion device include inboard and outboard motors (stern drive, i.e., inboard motor/outboard drive), inboard motors, and water jet drives.

The following shows an example of correspondence between the components described in SUMMARY OF THE INVENTION and the components described in the preferred embodiment above.

Propulsion device: Outboard motor 3

Individual start/stop switch: Start/stop switch 81

All-device start/stop switch: All-device start/stop switch 80

Operating state acquiring unit: Step S4 (FIG. 5)

Control unit: Remote control ECU 60

Individual operation/simultaneous operation determining unit: Steps S5 and S8 (FIG. 5)

Individual start/stop control unit: Steps S3 and S10 (FIG. 5)

All-device start/stop control unit: Steps S3 and S7 (FIG. 5)

Start permission condition determining unit: Step S6 (FIG. 5)

While preferred embodiments of the present invention have been described above, it is to be understood that variations and modifications will be apparent to those skilled in the art without departing the scope and spirit of the present invention. The scope of the present invention, therefore, is to be determined solely by the following claims.

The present application corresponds to Japanese Patent Application No. 2009-87083 filed in the Japan Patent Office on Mar. 31, 2009, and the entire disclosure of the application is incorporated herein by reference.

What is claimed is:

1. A marine vessel control apparatus arranged to start and stop engines respectively provided in a plurality of propulsion devices, the marine vessel control apparatus comprising:

a plurality of individual start/stop switches arranged to respectively correspond to the plurality of propulsion devices and arranged to be operated by an operator to individually start and stop the engines in the plurality of propulsion devices;

an all-device start/stop switch arranged to be operated by the operator to collectively start and stop the engines in the plurality of propulsion devices;

an operating state acquiring unit arranged to acquire operating states of the engines in the plurality of propulsion devices; and a control unit including a plurality of input ports respectively corresponding to the plurality of individual start/stop switches, each of the input ports being connected with the corresponding individual start/stop switch and all of the input ports being connected commonly with the all-device start/stop switch; wherein the control unit is arranged and programmed to interpret an input signal input to each of the plurality of input ports as a start command to start the engines in the plurality of propulsion devices corresponding to the input port or as a stop command to stop the engines in the plurality of propulsion devices corresponding to the input port according to an input pattern to the plurality of input ports and the operating states acquired by the operating state acquiring unit, and to control the start and stop of the engines in the plurality of propulsion devices according to the interpretation of the input signal.

2. A marine vessel propulsion system comprising:

a plurality of propulsion devices each including an engine; and a marine vessel control apparatus according to claim 1 arranged and programmed to control the plurality of propulsion devices.

3. A marine vessel comprising:

a hull;

a plurality of propulsion devices mounted on the hull and each including an engine; and a marine vessel control apparatus according to claim 1 arranged and programmed to control the plurality of propulsion devices.

4. A marine vessel control apparatus arranged to start and stop engines respectively provided in a plurality of propulsion devices, the marine vessel control apparatus comprising:

a plurality of individual start/stop switches arranged to respectively correspond to the plurality of propulsion devices and arranged to be operated by an operator to individually start and stop the engines in the plurality of propulsion devices;

an all-device start/stop switch arranged to be operated by the operator to collectively start and stop the engines in the plurality of propulsion devices;

an operating state acquiring unit arranged to acquire operating states of the engines in the plurality of propulsion devices; and a control unit including a plurality of input ports respectively corresponding to the plurality of individual start/stop switches, each of the input ports being connected with the corresponding individual start/stop switch and all of the input ports being connected commonly with the all-device start/stop switch; wherein the control unit is arranged and programmed to control the start and stop of the engines in the plurality of propulsion devices according to an input pattern input to the plurality of input ports and the operating states acquired by the operating state acquiring unit; and the control unit includes:

an individual operation/simultaneous operation determining unit arranged and programmed to determine, when a command is input to one of the input ports, if a command is also input to another one of the input ports at the same time;

an individual start/stop control unit arranged and programmed such that, when the individual operation/simultaneous operation determining unit determines that a command is input to only one of the input ports, the individual start/stop control unit starts or stops the engine in the propulsion device corresponding to the one input port; and an all-device start/stop control unit arranged and programmed such that, when the individual operation/simultaneous operation determining unit determines that a command is input to one of the input ports and a command is also input to another one of the input ports, the all-device start/stop control unit collectively starts or stops the engines in all of the propulsion devices.

5. The marine vessel control apparatus according to claim 4, wherein the all-device start/stop control unit is arranged and programmed such that, when the engines in all of the plurality of propulsion devices are stopped, the all-device start/stop control unit collectively starts the engines in all of the plurality of propulsion devices, while when at least one of the engines in the plurality of propulsion devices operates, the all-device start/stop control unit collectively stops the engines in all of the plurality of propulsion devices.

6. The marine vessel control apparatus according to claim 5, wherein the all-device start/stop control unit includes a start permission condition determining unit arranged and programmed to determine if all of the plurality of propulsion devices that are capable of being started meet a predetermined engine start permission condition, and to collectively start the engines in all of the plurality of propulsion devices if all the plurality of propulsion devices that are capable of being started meet the start permission condition.

7. A marine vessel control apparatus arranged to start and stop engines provided, respectively, in a plurality of propulsion devices, the marine vessel control apparatus comprising:

a plurality of individual start/stop switches arranged to respectively correspond to the plurality of propulsion devices and arranged to be operated by an operator to individually start and stop the engines in the plurality of propulsion devices;

an all-device start/stop switch arranged to be operated by the operator to collectively start and stop the engines in the plurality of propulsion devices; and a control unit including a plurality of input ports respectively corresponding to the plurality of individual start/stop switches, each of the input ports being connected with the corresponding individual start/stop switch and all of the input ports being connected commonly with the all-device start/stop switch; wherein the control unit is arranged and programmed to interpret an input signal input to each of the plurality of input ports as a start command to start the engines in the plurality of propulsion devices corresponding to the input port or as a stop command to stop the engines in the plurality of the propulsion devices corresponding to the input port according to an input to the plurality of input ports, and to control the start and stop of the engines in the plurality of propulsion devices according to the interpretation of the input signal.

8. The marine vessel control apparatus according to claim 7, wherein the control unit includes a unit arranged and programmed to start the engines in the plurality of propulsion devices sequentially at a certain time interval when collectively starting the engines in the plurality of propulsion devices.

9. The marine vessel control apparatus according to claim 7, wherein the control unit is arranged and programmed such that, when the engines in all of the plurality of propulsion devices are stopped, the control unit collectively starts the engines in all of the plurality of propulsion devices, while when at least one of the engines in the plurality of propulsion devices operates, the control unit collectively stops the engines in all of the plurality of propulsion devices.

10. A marine vessel propulsion system comprising:

a plurality of propulsion devices each including an engine; and a marine vessel control apparatus according to claim 7 arranged and programmed to control the plurality of propulsion devices.

11. A marine vessel comprising:

a hull;

a plurality of propulsion devices mounted on the hull and each including an engine; and a marine vessel control apparatus according to claim 7 arranged and programmed to control the plurality of propulsion devices.

* * * * *